United States Patent [19]

Kakii et al.

[11] Patent Number: 4,830,490

[45] Date of Patent: May 16, 1989

[54] APPARATUS FOR ALIGNING OPTICAL FIBERS

[75] Inventors: Toshiaki Kakii; Yuichi Toda; Yuichi Usui; Mitsuaki Osanai, all of Yokohama; Norio Kashima; Yasuyaki Kato, both of Mito, all of Japan

[73] Assignees: Nippon Telegraph and Telephone Public Corporation, Tokyo; Sumitomo Electric Industries, Ltd., Osaka, both of Japan

[21] Appl. No.: 104,531

[22] Filed: Sep. 30, 1987

Related U.S. Application Data

[63] Continuation of Ser. No. 642,819, Aug. 21, 1984, abandoned.

[30] Foreign Application Priority Data

Aug. 26, 1983 [JP] Japan ................. 57-155091

[51] Int. Cl.[4] ............ G01B 11/27; G01N 21/84
[52] U.S. Cl. .................... 356/73.1; 356/153
[58] Field of Search ............ 356/153, 73.1, 399; 350/96.21

[56] References Cited

U.S. PATENT DOCUMENTS

| 3,938,895 | 2/1976 | Bridger et al. | 356/152 |
| 4,102,717 | 7/1978 | Hensel | 350/96.21 |
| 4,188,087 | 2/1980 | D'Auria et al. | 350/96.20 |
| 4,475,790 | 9/1984 | Little | 350/96.21 |

FOREIGN PATENT DOCUMENT 30108 6/1981 United Kingdom .

OTHER PUBLICATIONS

OFC (Optical Fiber Communications) 1982—pp. 44-45. "Low-Loss Fusion Splice of Single Mode Fiber" by Tada, et al 1981 IEEE-pp. 27.7.1-27.7.6.

Primary Examiner—Vincent P. McGraw
Attorney, Agent, or Firm—Cushman, Darby & Cushman

[57] ABSTRACT

An apparatus for aligning the centers of the cores of two optical fibers prior to their being fused together for splicing. A pair of supporting members are provided, each of which has a V-shaped recess in which an end of a respective one of the optical fibers is fixed. The supporting members are movable relative to one another in a direction substantially perpendicular to the axial direction of the optical fibers. A transparent light conducting member forms a bottom portion of the recess of at least one of the supporting members. A photodetector is optically coupled to the light conducting member.

5 Claims, 2 Drawing Sheets

Butt joint loss

APPARATUS FOR ALIGNING OPTICAL FIBERS

This is a continuation of application Ser. No. 642,819, filed Aug. 21, 1984, which was abandoned upon the filing thereof.

BACKGROUND OF THE INVENTION

The present invention relates to an apparatus for aligning the cores of two optical fibers.

To join two optical fibers of two optical fiber cables by fusing the two fibers together, it is most important to align the opposite cores of the two optical fibers Since the optical loss at the splicing portion becomes larger as the deviation between the centers of the cores of the optical fibers becomes larger, it is required to splice the optical fibers with as little deviation as possible.

Conventionally, two optical fibers have been spliced in the manner now to be described As shown in Fig. 1, a covering is removed from end portions of each of optical fiber cables 1 and 2 to expose respective optical fibers 1a and 2a. The other end of the optical fiber cable 1 is connected to a light source 3 and the other end of the optical fiber cable 2 is connected to a photodetector 4. The light level detected by the photodetector 4 is displayed by a power meter 5, which is connected to the photodetector 4 through a line 6 and disposed near the splicing portion of the optical fibers. The relative positions of the cores of the optical fibers 1 and 2 are adjusted referring to the light level displayed on the power meter 5, and are held at the position where the light level becomes a maximum. The ends of the fibers are then fused to splice them Although effective, this conventional splicing system is not economical because it requires the connection of a power meter to the photodetector.

SUMMARY OF THE INVENTION

An object of the present invention is thus to obviate the above-mentioned drawback of the conventional splicing system and to provide a simple apparatus for aligning optical fibers efficiently To this end, the present invention provides an apparatus for aligning the centers of cores of two optical fibers which includes a pair of supporting members each of which has a recess of V-shaped configuration for fixing one end of a respective one of the optical fibers and which is relatively movable in a direction substantially perpendicular to the axial direction of the fixed optical fiber. A bottom portion of the recess of at least one of the supporting members is formed by a transparent member, and a photodetector is optically connected to the transparent member.

DESCRIPTION OF THE PREFERRED EMBODIMENTS

The present invention will now be explained in detail with respect to a typical embodiment thereof referring to FIGS. 2 to 5.

Figure 1:
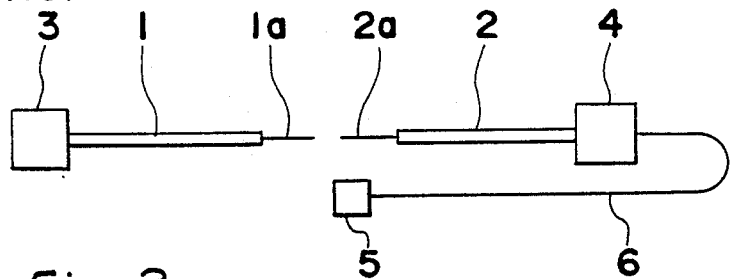
FIG. 1 (Prior Art) is a drawing used for explaining the conventional system of a aligning optical fibers.

In the conventional aligning system, the coatings at end portions of the two coated optical fibers are removed to expose the two bare optical fibers to be joined. The exposed end portions of the coated optical fibers are fixedly set in recesses of a V-shaped configuration of a pair of respective supporting members arranged opposed to each other. The opposed end portions thereof are aligned in the manner illustrated in FIG. 1 using an optical fiber aligning apparatus for relatively moving the supporting members in a direction perpendicular to the axial direction of the optical fibers.

The present invention provides an optical fiber aligning apparatus which is formed by improving the conventional optical fiber aligning apparatus. Specifically, the optical fiber aligning according to the present invention has a pair of supporting members 11 and 12, each of which has a V-shaped cross section and is movable up and down in FIG. 2 and in a direction perpendicular to the cross-sectional plane in FIG. 2. The supporting members 11 and 12 are provided with respective coated optical fiber clamping holes 15 and 16 for clamping the optical fiber cables therein in an inclined manner relative to bottom surfaces of the supporting members.

Figure 3:
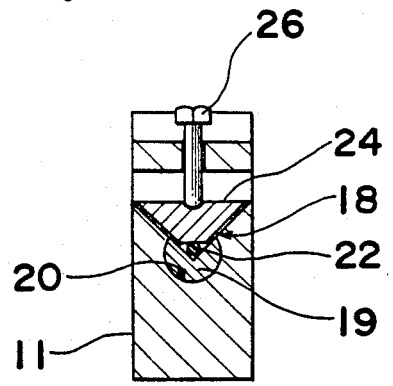
FIGS. 3 and 4 show cross sections cut away along lines A—A and B—B in FIG. 2, respectively.
Figure 4:
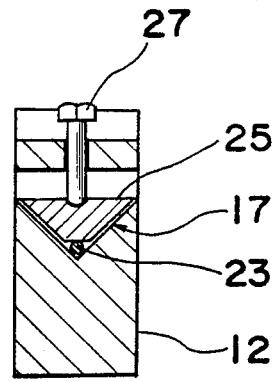

As shown in FIGS. 3 and 4, one of the supporting members 12 is provided with a recess 117 of a V-shaped configuration while the other supporting member 11 is provided with a recess 18 of a V-shaped configuration, with the bottom portion of the latter being formed by a transparent glass rod 19. The angle of each of the recesses 17 and 18 in the cross-sectional plane shown in FIGS. 3 and 4 is about 90 degrees.

Figure 2:
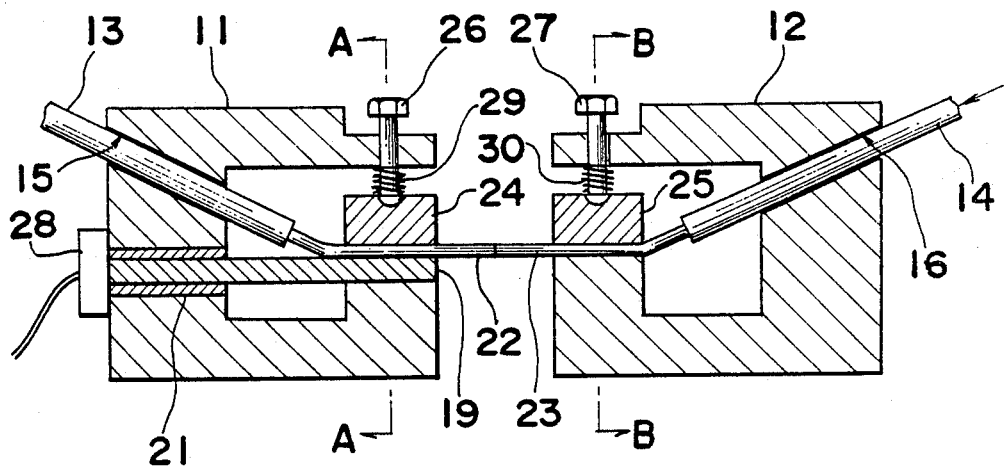
FIG. 2 shows the construction of an aligning apparatus of the invention.

The glass rod 19, having a typical diameter of about 2 mm, forms the bottom portion of the V-shaped recess 18 and extends axially. The glass rod 19 is fitted in a recess 20 which has a circular cross section, the diameter thereof being about 2 mm, and which is formed at the bottom of the recess 18 of the supporting member 11. As shown in FIG. 2, the glass rod 19 extends to the left of the supporting member 1 and connects at the other end thereof to a Ge photosensor 28 acting as a photodetector. Reference numeral 21 designates a rubber tube used for protecting the glass rod 19.

With this apparatus, if the centers of cores of the optical fibers 22 and 23 are not aligned, the beam passing through the optical fiber 23 is coupled into the cladding layer of the optical fiber 22. In accordance with the present invention, the light carried by that cladding layer is introduced to the photodetector through the glass rod 19 to thereby detect the amount of light leaking into the cladding layer. From this measurement, it can be determined that the centers of the cores of the glass fibers are aligned when the light level detected by the photodetector becomes a minimum.

Since the transparent member is merely required to be made of a material which will pass the light coupled thereto from the cladding layer, an optical fiber segment may be used in place of the glass rod. Further, in order to efficiently couple the light from the cladding layer to the transparent member 22, and hence to efficiently detect the leaked beam, the bottom surface of the recess 18 is preferably coated with a matching material such as a plastics material.

Pressing members 24 and 25 are fitted into the recesses 18 and 17 to fixedly mount the respective ends of the optical fibers 22 and 23. The pressing members 24 and 25 have flat surfaces at the bottoms thereof where they press against the respective optical fibers 22 and 23. The optical fibers 22 and 23 are fixedly fitted to the holding members 11 and 12 by the pressing members 24 and 25, which are urged by respective springs 29 and 30, respectively, into engagement with the fibers 22 and 23. The bottom surface of each of the pressing members 24 and 25 may be coated with a reflecting material in order to couple the leaked beam from the cladding layer to the glass rod more effectively. Reference numerals 26 and 27 represent guides. The guides 26 and 27 are, respectively, coupled with the pressing members 24 and 25 for downwardly pressing the optical fibers, which are depressed by springs 29 and 30, respectively. When the optical fibers have been pressed by clamping, guides 26 and 27 can slid upwardly such that the optical fibers are depressed by urging forces of springs 29 and 30.

The Ge photosensor may, if desired, be attached to the right or left side of the supporting member 11 in FIG. 3 by bending the glass rod along the outer periphery of the supporting member.

An aligning operation for two opposing optical fibers using thus-constructed aligning apparatus will now be described. At first, the coated optical fibers 13 and 14 are fixed to the supporting members as shown and a light beam is introduced into the fiber 23 as indicated by an arrow in FIG. 2. The light level of the beam leaked from the bare optical fiber 22, which receives the beam from the bare fiber 23, is detected. One or both of the supporting members 11 and 12 is moved up and down in a plane perpendicular to the cross-sectional plane of the fibers while monitoring the light level detected by the photosensor 28. The relative movement between the supporting members 11 and 12 is stopped when the detected light level becomes a minimum. Then, the opposite ends of the optical fibers 22 an 23 are fused to splice since the centers of the fibers are then aligned.

An experiment of aligning optical fibers using a semiconductor laser producing an output at a wavelength of 1.3 m will be described. With the output power of the laser set at about −20 dBm, the detected level of the leaked beam when it became a minimum was about −60 dBm, and the power loss due to the butt joint of the optical fibers was about 0.5 dB. The magnitude of the coupling loss in this case was almost the same as in the conventional system were the optical fibers are coupled referring to the power meter.

Figure 5:
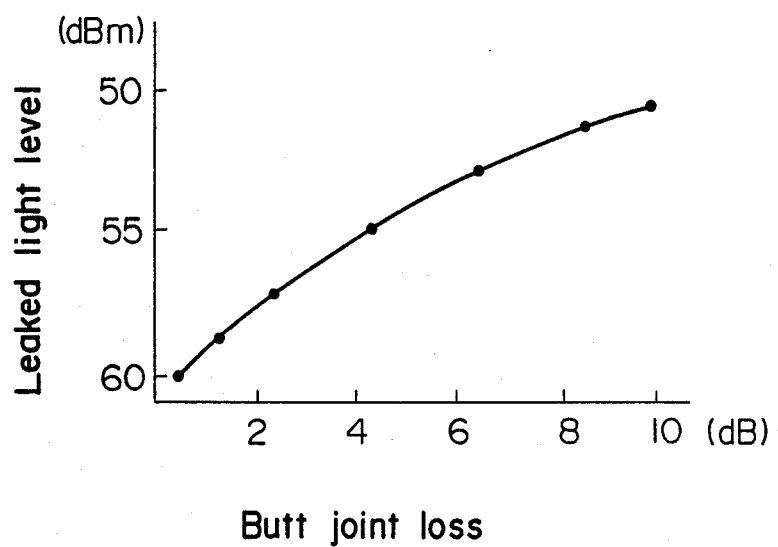
FIG. 5 is a graph showing a relation between the butt joint loss of the optical fibers and the leaked light level.

The relation between the coupling loss and the light level of the leaked light in the case of aligning the optical fibers with the output power of the laser set to about −20 dBm is plotted in FIG. 5. As is clear from FIG. 5, a single-value monotonic relation exists between the coupling loss and the leaked light level, demonstrating the fact that the two optical fibers can be aligned by detecting the leaked light level. The average level of the splicing loss in case of butt joint single-mode optical fibers utilizing the aligning apparatus according to the present invention was less than about 0.1 dB, thereby proving that the aligning apparatus according to the present invention is effective.

In the above-described embodiment of the present invention, the transparent member and the photodetector are provided for only one of the supporting members, but they may be provided for the other or both of the supporting members. The optical fiber described above is referred to as one having a removable coating, but it may be one which includes a coating film having a thickness of about a few microns coated over the outer periphery of the cladding layer.

As described above, the aligning apparatus according to the present invention is provided with a photodetector disposed near the splicing portion of the optical fibers. The aligning operation of the optical fibers can be achieved referring to the detected level of the beam leaked from the coupling region. Thus, the present invention does not need equipment as a power meter, etc., required with the conventional approach, thereby shortening the total time needed to effect the connection and lowering the attendant costs. Further in the present invention, workability for the aligning is improved, since connection of the power meter to the photoconductor at the distal end of the cable is unnecessary.

We claim:

1. An apparatus for aligning the cores of first and second bare optical fibers having, respectively, first and second ends to be fusion-bonded with each other, comprising:

first and second supporting members each of which has a substantially V-shaped recess for receiving said first and second ends of said first and second bare optical fibers respectively, said supporting members being moveable relative to one another in a direction substantially perpendicular to an axial direction of said bare optical fibers;

first and second pressing members disposed to fit within the V-shape recesses of said first and second supporting members respectively thereby pressing said first and second bare optical fibers rigidly against the sides of the respective V-shaped recesses so as to secure them therein;

a transparent light conducting member forming a portion of said second supporting member, said transparent member having a portion of said second supporting member recess formed therein for receiving at least a portion of said bare optical fiber received into said second supporting member recess so that said second bare optical fiber can be pressed against said transparent member by said second pressing member, light leaked from a surface of said second bare optical fiber flowing into said transparent member; and a photo detector optically coupled to said transparent light conducting member for receiving the leakage light collected by a transparent member and providing a signal indicative of the amount thereof, such that said first and second ends are fusion-bonded with each other when the amount reaches a minimum value.

2. The optical fiber core aligning apparatus according to claim 1, wherein said transparent member is made of glass.

3. The optical fiber core aligning apparatus according to claim 1, wherein said transparent member comprises an optical fiber.

4. The optical fiber core aligning apparatus according to claim 1, wherein said bottom portion of said recess formed by said transparent member is coated with a matching material.

5. The optical fiber core aligning apparatus according to claim 1, wherein said bottom portion of said recess formed by said transparent member is coated with a plastics material.

* * * * *